US011989745B2

(12) United States Patent
Badger et al.

(10) Patent No.: US 11,989,745 B2
(45) Date of Patent: *May 21, 2024

(54) SYSTEMS AND METHODS FOR PREDICTING CONSUMER SPENDING BEHAVIOR BASED ON HISTORICAL TRANSACTION ACTIVITY PROGRESSIONS

(71) Applicant: WORLDPAY, LLC, Symmes Township, OH (US)

(72) Inventors: Brent Badger, Powell, OH (US); Dennis Kettler, Lebanon, OH (US)

(73) Assignee: Worldpay, LLC, Symmes Township, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/236,171

(22) Filed: Apr. 21, 2021

(65) Prior Publication Data

US 2021/0241295 A1  Aug. 5, 2021

Related U.S. Application Data

(63) Continuation of application No. 15/382,026, filed on Dec. 16, 2016, now Pat. No. 11,023,909.

(51) Int. Cl.
*G06Q 10/00* (2023.01)
*G06Q 30/0202* (2023.01)
*G06Q 30/0251* (2023.01)

(52) U.S. Cl.
CPC ..... *G06Q 30/0202* (2013.01); *G06Q 30/0255* (2013.01)

(58) Field of Classification Search
None
See application file for complete search history.

(56) References Cited

U.S. PATENT DOCUMENTS 8,706,647 B2 * 4/2014 Pathak ............... G06Q 30/0273
705/7.29
9,535,897 B2 * 1/2017 Anderson ............. G06F 16/951
(Continued)

OTHER PUBLICATIONS

Credit Card Tokenization: Durable Tokens vs. Transaction-Based Tokens, Nov. 16, 2016, https://www.wexinc.com/insights/blog/corporate-payments-edge/credit-card-tokenization-types/#:~: text=A%20transaction%2Dbased%20token%20is,token%20issued%20for%20each%20transaction., p. 1-4. (Year: 2016).*
(Continued)

*Primary Examiner* — Joseph M Waesco
(74) *Attorney, Agent, or Firm* — Bookoff McAndrews, PLLC

(57) ABSTRACT

Systems and methods are disclosed for predicting consumer spending behavior based on historical purchase activity progressions. One method includes: receiving transaction data related to two or more past payment transactions of a consumer; receiving environmental and/or behavioral data associated with each of the past payment transactions; determining, based on the transaction data and environmental and/or behavioral data, historical purchase activity progressions, wherein each of the historical purchase activity progressions identifies one or more trends in environmental and/or behavioral data; receiving transaction data related to a current payment transaction of the consumer; receiving environmental and/or behavioral data associated with the current payment transaction; comparing the environmental and/or behavioral data associated with one or more of the past payment transactions with environmental and/or behavioral data associated with the current payment transaction; and determining whether a progression of one or more of the past payment transactions to the current payment transaction maps to one of the historical purchase activity progressions.

20 Claims, 9 Drawing Sheets

(56) References Cited

U.S. PATENT DOCUMENTS

| | | | | |
|---|---|---|---|---|
| 9,706,265 | B2* | 7/2017 | Harrison | H04N 21/4126 |
| 9,773,246 | B2* | 9/2017 | Faith | G06Q 30/0224 |
| 2010/0161379 | A1* | 6/2010 | Bene | G06Q 30/0202 |
| | | | | 705/7.31 |
| 2011/0087519 | A1* | 4/2011 | Fordyce, III | G06Q 30/02 |
| | | | | 705/7.29 |
| 2011/0093327 | A1* | 4/2011 | Fordyce, III | G06Q 30/0224 |
| | | | | 705/14.66 |
| 2011/0231225 | A1* | 9/2011 | Winters | G06Q 30/0269 |
| | | | | 705/7.29 |
| 2011/0231257 | A1* | 9/2011 | Winters | G06Q 30/0255 |
| | | | | 705/14.53 |
| 2011/0231258 | A1* | 9/2011 | Winters | G06Q 30/02 |
| | | | | 705/14.53 |
| 2011/0231305 | A1* | 9/2011 | Winters | G06Q 20/384 |
| | | | | 705/1.1 |
| 2011/0313835 | A1* | 12/2011 | Falkenborg | G06Q 30/0224 |
| | | | | 705/30 |
| 2011/0313900 | A1* | 12/2011 | Falkenborg | G06Q 40/12 |
| | | | | 705/30 |
| 2012/0066065 | A1* | 3/2012 | Switzer | G06Q 30/0255 |
| | | | | 705/1.1 |
| 2012/0109734 | A1* | 5/2012 | Fordyce, III | G06Q 30/0239 |
| | | | | 705/14.25 |
| 2012/0158455 | A1* | 6/2012 | Pathak | G06Q 50/01 |
| | | | | 705/7.29 |
| 2013/0151388 | A1* | 6/2013 | Falkenborg | G06Q 40/02 |
| | | | | 705/35 |
| 2013/0191195 | A1* | 7/2013 | Carlson | G06Q 30/0224 |
| | | | | 705/14.58 |
| 2013/0191198 | A1* | 7/2013 | Carlson | G06F 9/468 |
| | | | | 705/14.23 |
| 2013/0191213 | A1* | 7/2013 | Beck | G06Q 30/0207 |
| | | | | 705/14.64 |
| 2013/0197991 | A1* | 8/2013 | Basu | G06Q 20/385 |
| | | | | 705/14.39 |
| 2013/0204703 | A1* | 8/2013 | Carlson | G06Q 30/0214 |
| | | | | 705/14.56 |
| 2013/0218664 | A1* | 8/2013 | Carlson | G06Q 30/0244 |
| | | | | 705/14.43 |
| 2013/0218670 | A1* | 8/2013 | Spears | G06Q 30/0248 |
| | | | | 705/14.47 |
| 2013/0346264 | A1* | 12/2013 | Falkenborg | G06Q 40/02 |
| | | | | 705/30 |
| 2014/0006309 | A1* | 1/2014 | Reisman | G06Q 30/02 |
| | | | | 705/347 |
| 2014/0074687 | A1* | 3/2014 | Halpern | G06Q 40/02 |
| | | | | 705/38 |
| 2014/0172625 | A1* | 6/2014 | Reisman | G06Q 30/0282 |
| | | | | 705/26.7 |
| 2015/0019329 | A1* | 1/2015 | Ramer | G06Q 30/0255 |
| | | | | 705/14.46 |
| 2015/0039388 | A1* | 2/2015 | Rajaraman | G06Q 30/0613 |
| | | | | 705/7.29 |
| 2016/0012452 | A1* | 1/2016 | Unser | G06Q 30/0201 |
| | | | | 705/7.29 |
| 2016/0012457 | A1* | 1/2016 | Unser | G06Q 10/063 |
| | | | | 705/7.29 |
| 2016/0063546 | A1* | 3/2016 | Ghosh | G06Q 30/0255 |
| | | | | 705/14.53 |
| 2017/0039599 | A1* | 2/2017 | Tunnell | G06Q 30/0241 |
| 2017/0098234 | A1* | 4/2017 | Carlson | G06Q 30/0215 |
| 2017/0200192 | A1* | 7/2017 | DeAngelo | G06Q 30/0261 |
| 2017/0201779 | A1* | 7/2017 | Publicover | H04N 21/4532 |

OTHER PUBLICATIONS

How Multi-Pay Tokens Can Reduce Security Risks and the PCI Compliance Burden for eCommerce, 2012, FirstData. https://www.firstdata.com/downloads/thought-leadership/MultipayTokensWP.pdf, p. 1-9 (Year: 2012).

* cited by examiner

SYSTEMS AND METHODS FOR PREDICTING CONSUMER SPENDING BEHAVIOR BASED ON HISTORICAL TRANSACTION ACTIVITY PROGRESSIONS

CROSS-REFERENCE TO RELATED APPLICATIONS

This patent application is a continuation of and claims the benefit of priority to U.S. application Ser. No. 15/382,026 filed on Dec. 16, 2016, the entireties of which are incorporated herein by reference.

FIELD OF DISCLOSURE

The present disclosure relates generally to the field of field of determining a correlation between online advertising campaigns or online activity and subsequent purchase events.

BACKGROUND

Many companies utilize a variety of different marketing campaigns to attract new business, increase revenue, or serve other business needs. For example, it is not uncommon for companies to advertise through multiple marketing channels, such as TV, radio, Internet, and so forth. With specific regard to Internet-based or electronic marketing, it is often difficult for these companies to correlate advertising and marketing expenditures to subsequent purchase events, especially when those purchase events occur through different sales channels or occur subsequent to a consumer's initial exposure to marketing communications.

Thus, there is a desire for systems and methods configured to correlate advertising and marketing expenditures to consumer spending behavior, e.g., predicting consumer spending behavior based on historical transaction activity progressions.

SUMMARY

According to certain aspects of the present disclosure, systems and methods are disclosed for predicting consumer spending behavior based on historical purchase activity progressions.

In one embodiment, a computer-implemented method is disclosed for predicting consumer spending behavior based on historical purchase activity progressions. The method includes: receiving, in a database associated with a profiler computing system, transaction data related to two or more past payment transactions of a consumer, wherein for each of the past payment transactions, transaction data is data electronically received from one of a plurality of merchants to effectuate an electronic transfer of funds via an electronic payment network; receiving, in a database associated with a profiler computing system, environmental and/or behavioral data associated with each of the past payment transactions of the consumer; determining, based on the transaction data and environmental and/or behavioral data associated with each of the past payment transactions, a plurality of historical purchase activity progressions, wherein each of the historical purchase activity progressions identifies one or more trends in environmental and/or behavioral data based on an analysis of the transaction data and the environmental and/or behavioral data associated with each of the two or more past payment transactions of the purchaser; subsequent to determining the plurality of historical purchase activity progressions, receiving, in a database associated with the profiler computing system, transaction data related to a current payment transaction of the consumer, wherein the current payment transaction for the consumer originates at a merchant; receiving, in a database associated with the profiler computing system, environmental and/or behavioral data associated with the current payment transaction; comparing the environmental and/or behavioral data associated with one or more of the past payment transactions with environmental and/or behavioral data associated with the current payment transaction; determining, using the comparison, whether a progression of one or more of the past payment transactions to the current payment vehicle-based payment transaction maps to one of the historical purchase activity progressions from the plurality of historical purchase activity progressions; and when the progression of the consumer from one or more of the past payment transactions to the current payment transaction maps to a historical purchase activity progression from the plurality of consumer purchase activity progressions, providing an indication of at least one predicted purchase transaction based on that historical purchase activity progression.

In accordance with another embodiment, a system is disclosed for predicting consumer spending behavior based on historical purchase activity progressions. The system comprises: a data storage device storing instructions for predicting consumer spending behavior based on historical purchase activity progressions; and a processor configured to execute the instructions to perform a method including: receiving, in a database associated with a profiler computing system, transaction data related to two or more past payment transactions of a consumer, wherein for each of the past payment transactions, transaction data is data electronically received from one of a plurality of merchants to effectuate an electronic transfer of funds via an electronic payment network; receiving, in a database associated with a profiler computing system, environmental and/or behavioral data associated with each of the past payment transactions of the consumer; determining, based on the transaction data and environmental and/or behavioral data associated with each of the past payment transactions, a plurality of historical purchase activity progressions, wherein each of the historical purchase activity progressions identifies one or more trends in environmental and/or behavioral data based on an analysis of the transaction data and the environmental and/or behavioral data associated with each of the two or more past payment transactions of the purchaser; subsequent to determining the plurality of historical purchase activity progressions, receiving, in a database associated with the profiler computing system, transaction data related to a current payment transaction of the consumer, wherein the current payment transaction for the consumer originates at a merchant; receiving, in a database associated with the profiler computing system, environmental and/or behavioral data associated with the current payment transaction; comparing the environmental and/or behavioral data associated with one or more of the past payment transactions with environmental and/or behavioral data associated with the current payment transaction; determining, using the comparison, whether a progression of one or more of the past payment transactions to the current payment vehicle-based payment transaction maps to one of the historical purchase activity progressions from the plurality of historical purchase activity progressions; and when the progression of the consumer from one or more of the past payment transactions to the current payment transaction maps to a historical purchase activity progression from the plurality of consumer purchase activity progressions, providing an indication of at least one predicted purchase transaction based on that historical purchase activity progression.

In accordance with another embodiment, a non-transitory machine-readable medium stores instructions that, when executed by profiler computing system, causes the profiler computing system to perform a method for predicting consumer spending behavior based on historical purchase activity progressions. The method includes: receiving, in a database associated with a profiler computing system, transaction data related to two or more past payment transactions of a consumer, wherein for each of the past payment transactions, transaction data is data electronically received from one of a plurality of merchants to effectuate an electronic transfer of funds via an electronic payment network; receiving, in a database associated with a profiler computing system, environmental and/or behavioral data associated with each of the past payment transactions of the consumer; determining, based on the transaction data and environmental and/or behavioral data associated with each of the past payment transactions, a plurality of historical purchase activity progressions, wherein each of the historical purchase activity progressions identifies one or more trends in environmental and/or behavioral data based on an analysis of the transaction data and the environmental and/or behavioral data associated with each of the two or more past payment transactions of the purchaser; subsequent to determining the plurality of historical purchase activity progressions, receiving, in a database associated with the profiler computing system, transaction data related to a current payment transaction of the consumer, wherein the current payment transaction for the consumer originates at a merchant; receiving, in a database associated with the profiler computing system, environmental and/or behavioral data associated with the current payment transaction; comparing the environmental and/or behavioral data associated with one or more of the past payment transactions with environmental and/or behavioral data associated with the current payment transaction; determining, using the comparison, whether a progression of one or more of the past payment transactions to the current payment vehicle-based payment transaction maps to one of the historical purchase activity progressions from the plurality of historical purchase activity progressions; and when the progression of the consumer from one or more of the past payment transactions to the current payment transaction maps to a historical purchase activity progression from the plurality of consumer purchase activity progressions, providing an indication of at least one predicted purchase transaction based on that historical purchase activity progression.

Additional objects and advantages of the disclosed embodiments will be set forth in part in the description that follows, and in part will be apparent from the description, or may be learned by practice of the disclosed embodiments. The objects and advantages on the disclosed embodiments will be realized and attained by means of the elements and combinations particularly pointed out in the appended claims.

It is to be understood that both the foregoing general description and the following detailed description are exemplary and explanatory only and are not restrictive of the detailed embodiments, as claimed.

BRIEF DESCRIPTION OF THE DRAWINGS

It is believed that certain embodiments will be better understood from the following description taken in conjunction with the accompanying drawings, in which like references indicate similar elements and in which.

DETAILED DESCRIPTION

Figure 1:
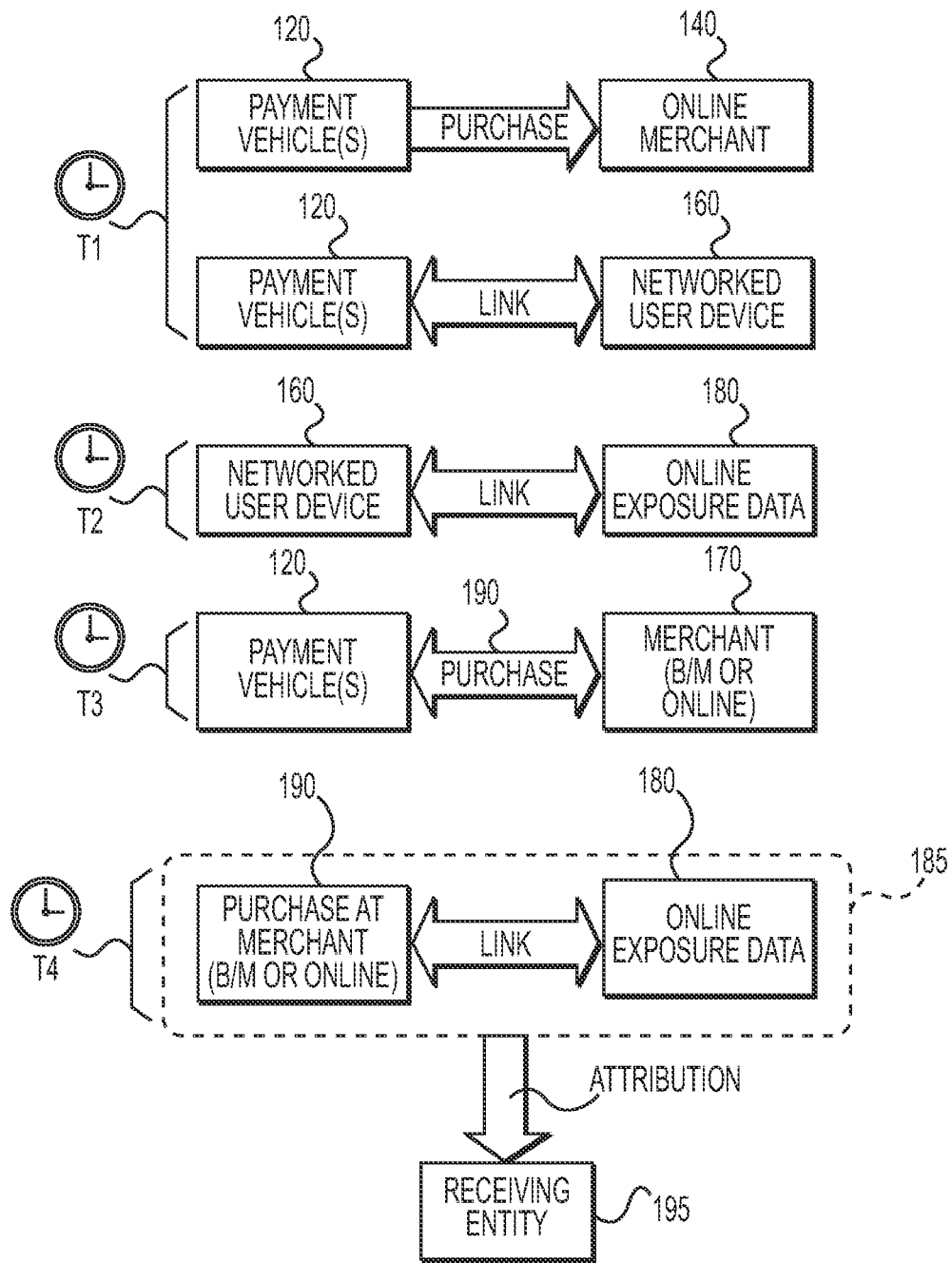
FIG. 1 schematically depicts example linkages that can be determined in accordance with various non-limiting embodiments.

Various non-limiting embodiments of the present disclosure will now be described to provide an overall understanding of the principles of the structure, function, and use of systems and methods disclosed herein. One or more examples of these non-limiting embodiments are illustrated in the selected examples disclosed and described in detail with reference made to the figures in the accompanying drawings. Those of ordinary skill in the art will understand that systems and methods specifically described herein and illustrated in the accompanying drawings are non-limiting embodiments. The features illustrated or described in connection with one non-limiting embodiment may be combined with the features of other non-limiting embodiments. Such modifications and variations are intended to be included within the scope of the present disclosure.

The systems, apparatuses, devices, and methods disclosed herein are described in detail by way of examples and with reference to the figures. The examples discussed herein are examples only and are provided to assist in the explanation of the apparatuses, devices, systems, and methods described herein. None of the features or components shown in the drawings or discussed below should be taken as mandatory for any specific implementation of any of these the apparatuses, devices, systems or methods unless specifically designated as mandatory. In addition, elements illustrated in the figures are not necessarily drawn to scale for simplicity and clarity of illustration. For ease of reading and clarity, certain components, modules, or methods may be described solely in connection with a specific figure. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such. Any failure to specifically describe a combination or sub-combination of components should not be understood as an indication that any combination or sub-combination is not possible. It will be appreciated that modifications to disclosed and described examples, arrangements, configurations, components, elements, apparatuses, devices, systems, methods, etc. can be made and may be desired for a specific application. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

Reference throughout the specification to "various embodiments," "some embodiments," "one embodiment," "some example embodiments," "one example embodiment," or "an embodiment" means that a particular feature, structure, or characteristic described in connection with any embodiment is included in at least one embodiment. Thus, appearances of the phrases "in various embodiments," "in some embodiments," "in one embodiment," "some example embodiments," "one example embodiment," or "in an embodiment" in places throughout the specification are not necessarily all referring to the same embodiment. Furthermore, the particular features, structures, or characteristics may be combined in any suitable manner in one or more embodiments.

Throughout this disclosure, references to components or modules generally refer to items that logically can be grouped together to perform a function or group of related functions. Like reference numerals are generally intended to refer to the same or similar components. Components and modules can be implemented in software, hardware, or a combination of software and hardware. The term "software" is used expansively to include not only executable code, for example machine-executable or machine-interpretable instructions, but also data structures, data stores and computing instructions stored in any suitable electronic format, including firmware, and embedded software. The terms "information" and "data" are used expansively and includes a wide variety of electronic information, including executable code; content such as text, video data, and audio data, among others; and various codes or flags. The terms "information," "data," and "content" are sometimes used interchangeably when permitted by context. It should be noted that although for clarity and to aid in understanding some examples discussed herein might describe specific features or functions as part of a specific component or module, or as occurring at a specific layer of a computing device (for example, a hardware layer, operating system layer, or application layer), those features or functions may be implemented as part of a different component or module or operated at a different layer of a communication protocol stack. Those of ordinary skill in the art will recognize that the systems, apparatuses, devices, and methods described herein can be applied to, or easily modified for use with, other types of equipment, can use other arrangements of computing systems such as client server distributed systems, and can use other protocols, or operate at other layers in communication protocol stacks, than are described.

Many companies utilize a variety of different marketing campaigns to attract new business, increase revenue, or serve other business needs. Many companies engage in advertising through multiple marketing channels, such as TV, radio, Internet, and so forth. With specific regard to Internet-based marketing, it is often difficult for these companies to correlate advertising and marketing expenditures to subsequent purchase events, especially when those purchase events occur through different sales channels or occur subsequent to a consumer's initial exposure to marketing communications. By way of example, a typical consumer may spend time visiting or otherwise interacting with a merchant's website to research a particular good and/or service, referred to herein as "product." The consumer may arrive at the merchant's website through "clicking through" an advertisement appearing on a webpage or within a mobile application, through keyword searching, or through other means. The consumer may decide to the buy the product though the merchant's ecommerce portal during that visit to the merchant's website. Such purchase events are generally traceable by the merchant, or an affiliated entity, such that a correlation between the consumer's online activity and the purchase event can be tracked and identified as a successful "conversion." However, in other instances, instead of purchasing the product in an online transaction, the consumer may decide to physically travel to a brick-and-mortar retail location of the merchant and purchase the product.

Using presently available consumer tracking data, there may be a disconnect between the consumer's online activity and their subsequent purchases at the brick-and-mortar retail location. Nevertheless, it may be desirable for the merchant, or other interested parties, to understand any correlation that exists between the consumer's previous exposure to the merchant's website, or other online activities, and the subsequent purchase of a product at the brick-and-mortar retail location.

In yet other instances, the consumer may decide to leave the merchant's website and then return to the merchant's website at a later point in time to make the purchase. If the consumer arrived at the website the first time by "clicking through" an online advertisement, but arrived at the website the second time through other means (e.g., keyword searching, direct URL input, etc.), the correlation between the two online sessions may not be known to a merchant. More particularly, due to techniques used for tracking online activity by marketers and other data aggregators, when the consumer returns to the website at a later point in time to make a purchase, the online advertisements to which the consumer previously interacted with do not typically get credited for driving that purchase event. Accordingly, it is desirable for merchants to know that a correlation exists between initial interaction with online advertisements and/or other online activities and the subsequent purchase of the product at an ecommerce website during a separate online session.

The presently disclosed system and methods can generally provide a correlation of online activity of a consumer to subsequent purchase events by that consumer. The subsequent purchase events can occur at any type of merchant location, including online/ecommerce merchant locations and brick-and-mortar retail locations. The online activity can include exposure to marketing assets, advertisements, offers, coupons, websites, as well as online searching, and so forth. Such online activity can be tracked and logged by a data aggregator computing system. In some embodiments, at least a portion of the data aggregator functionality is performed by a third party service, such as Google®. Additionally or alternatively, in some embodiments, at least a portion of the data aggregator functionality is performed by the merchant's web servers and/or servers including or providing data aggregation services.

In accordance with the systems and methods described herein, a profile for the consumer can be generated and stored by a profiler computing system subsequent to the consumer making an online purchase. The online purchase can be made through interactions with a networked user device or computing device (e.g., a laptop, a desktop computer, a smart appliance such as a smart television, a mobile phone, or any other mobile device, such as a tablet computer, and so forth). As described in more detail below, during the online purchase event the purchaser can provide transaction data (e.g., purchase information) to a financial transaction services processor of a merchant, including payment vehicle information, over a network.

One example of a financial transaction services processor is Vantiv®. Additionally, other information can be provided to the financial transaction services processor over the network during the course of the transaction and, in some embodiments, can be provided after conclusion of the transaction. Such information can include a tracking element associated with the purchaser and/or the purchaser's networked user device. For example, in some embodiments, the tracking element can be a device identifier of the purchaser's networked user device. This device identifier can be used as part of the fraud prevention services of the financial transaction services processor or the payment networks (e.g., Visa® or MasterCard®).

The device identifier can be, for example, one or more of a source IP address, a MAC address, a device fingerprint, a browser fingerprint, a unique identifier, or any other suitable type of identifier corresponding to the networked user device (e.g., computing device) of the purchaser.

Additionally or alternatively, the tracking element can be an identifier associated with the purchaser. For example, in some embodiments, the tracking element can be embodied as, or otherwise include, an email address, a postal address, a phone number, a loyalty account number, a username, and/or any other unique identifier associated with the purchaser. Additionally, in accordance with the present disclosure, the financial transaction services processor can provide information from the online or initial purchase event to the profiler computing system.

As described in more detail below, the profiler computing system in accordance with the present disclosure can store a profile for the purchaser that generally links that tracking element (e.g., the device ID or purchaser ID) to the payment vehicle used by the purchaser during the online purchase event. In some embodiments, more than one tracking element can be linked to a particular purchaser. Furthermore, as is to be appreciated, in view of PCI requirements, various tokenization techniques can be used to mask personally identifiable information without departing from the scope of the present disclosure. In this regard, if the profiler computing system links a tracking element to a token, it is to be understood that the tracking element is still considered to be linked to the payment vehicle. The profile computer system can continue to augment the purchaser profile over time as additional online transactions are made by the purchaser. For example, if the purchaser initiates a second transaction from the same networked user device using a second payment vehicle, the second payment vehicle can be added to the purchaser's profile. In that way, the second payment vehicle may be linked to the tracking element.

The purchaser can then make a purchase at a merchant location (e.g., a brick-and-mortar retail location). Subsequently, a financial transaction services processor of the merchant can facilitate the communications with various payment networks (e.g., VISA® or MasterCard®), as may be needed, to complete the purchase event. For example, the purchaser can provide a payment vehicle to a point-of-sale system (POS) of the merchant. The POS can, in turn, communicate transactional information (e.g., subsequent purchase information) to the financial transaction services processor. The transactional information can typically include transaction amount, merchant identifier (MID), payment vehicle data, among other information. In accordance with the present disclosure, the financial transaction services processor can provide information from the subsequent purchase event to the profiler computing system. In one embodiment, payment vehicle information is provided to the profiler computing system so that the profile computer system can determine if there is an affiliated (e.g., associated) profile. If there is a profile, the profiler computing system can determine the tracking element, or tracking elements, that are linked to that payment vehicle. As described above, in some embodiments, this linkage can be established during the purchaser's previous online purchases. Additionally or alternatively, the linkage may be established prior to the purchaser making on online purchase. For example, in some embodiments, the linkage may be established based at least in part on, or otherwise as a function of, payment vehicle information maintained in a purchaser's mobile wallet prior to making an online purchase. In any event, using the tracking element and the data collected by the data aggregator computing system, it can be determined if the purchase event at the merchant location (e.g., the brick-and-mortar retail location) can be attributed to any previous online activity of the purchaser. Such attribution can be based on, for example, the transactional information provided to the financial transaction services processor by the POS. For example, in some embodiments, the attribution can be based on the payment vehicle data and/or the MID provided to the financial transaction services processor by the POS.

Once attribution has been determined, various types of reporting can be provided by the profiler computing system. Such reporting can generally attribute various online exposure events to subsequent purchase events. The reporting can be anonymized such that personal identifying information is not provided, but the effectiveness of various online marketing efforts can still be gleaned. Additionally, the reporting can segment or otherwise classify groups of purchasers, purchase events, online activities, or provide other divisions, as may be useful to a merchant, marketer, or other receiving entity. Based on this segmentation, targeted offers or other forms or marketing can be directed to particular groups of purchasers, such as purchasers that visit particular websites, purchasers who visit particular merchants, purchasers who use particular types of payment vehicles, purchasers who perform particular online searches, and so forth.

Accordingly, in view of the systems and methods described herein, and as described in more detail below, a purchaser's purchasing activity can be attributed to the purchaser's previous online activity.

FIG. 1 schematically depicts the linkages that can be determined in accordance with the systems and methods described herein. As depicted by times T1-T4, such linkages can be developed over time, as the information becomes available. Additionally, while not shown, the linkages can also be updated over time, as the underlying data may become stale or inaccurate. Payment vehicle(s) 120 are first used by a purchaser to make a purchase at an online merchant 140. Such purchase can be made by network communications between a networked user device 160 or computing device of the purchaser and the online merchant 140 or through direct communications with the merchant's affiliated financial transaction services processor. In any event, a link can be established between the payment vehicle (s) 120 and the networked user device 160. Prior to, or subsequent to, the linking of the payment vehicle(s) 120 and the networked user device 160, the purchaser can be exposed to online exposure data 180 while interacting with the networked user device 160. Online exposure data 180 is not intended to be limited to any particular type of data, but rather broadly refers to the wide array of information that a purchaser may see, enter, interact with, or otherwise encounter while engaged in online activities. Examples of online exposure data 180 can include, without limitation, URLs visited, links that were clicked, keyword searches performed, online shopping baskets created, electronic advertisement interaction data, electronic marketing interaction data, and so forth. At a later point in time, the purchaser can make a purchase 190 at a merchant 170 using one of the payment vehicles 120. The merchant 170 can be any type of merchant, such as a brick-and-mortar retail location or an ecommerce/web-based merchant. Based on that purchase event, the purchase 190 at the merchant 170 can be linked or attributed to the online exposure data 180, as indicated by attribution 185. Such attribution can be based on, for example, satisfaction of various rules or guidelines for determining attribution. Such rules can include time frames, geographical restraints, and so forth. In one example, in order for a purchase 190 at a merchant 170 to be attributed to online exposure data 180, the purchaser must have had to encounter the online exposure data 180 within a certain time frame (e.g., less than 6 months, less than 3 month, less than 1 month, less than 1 week, and so forth). In this way, restrictive rules for determining attribution can lead to higher confidence levels in the attribution 185. The attribution 185 can ultimately be outputted or otherwise provided to a receiving entity 195. The receiving entity 195 can be, for example, the merchant 170, a data aggregator, a financial transaction services processor, a marketing entity, an analytics entity, or any other interested party.

Figure 2A:
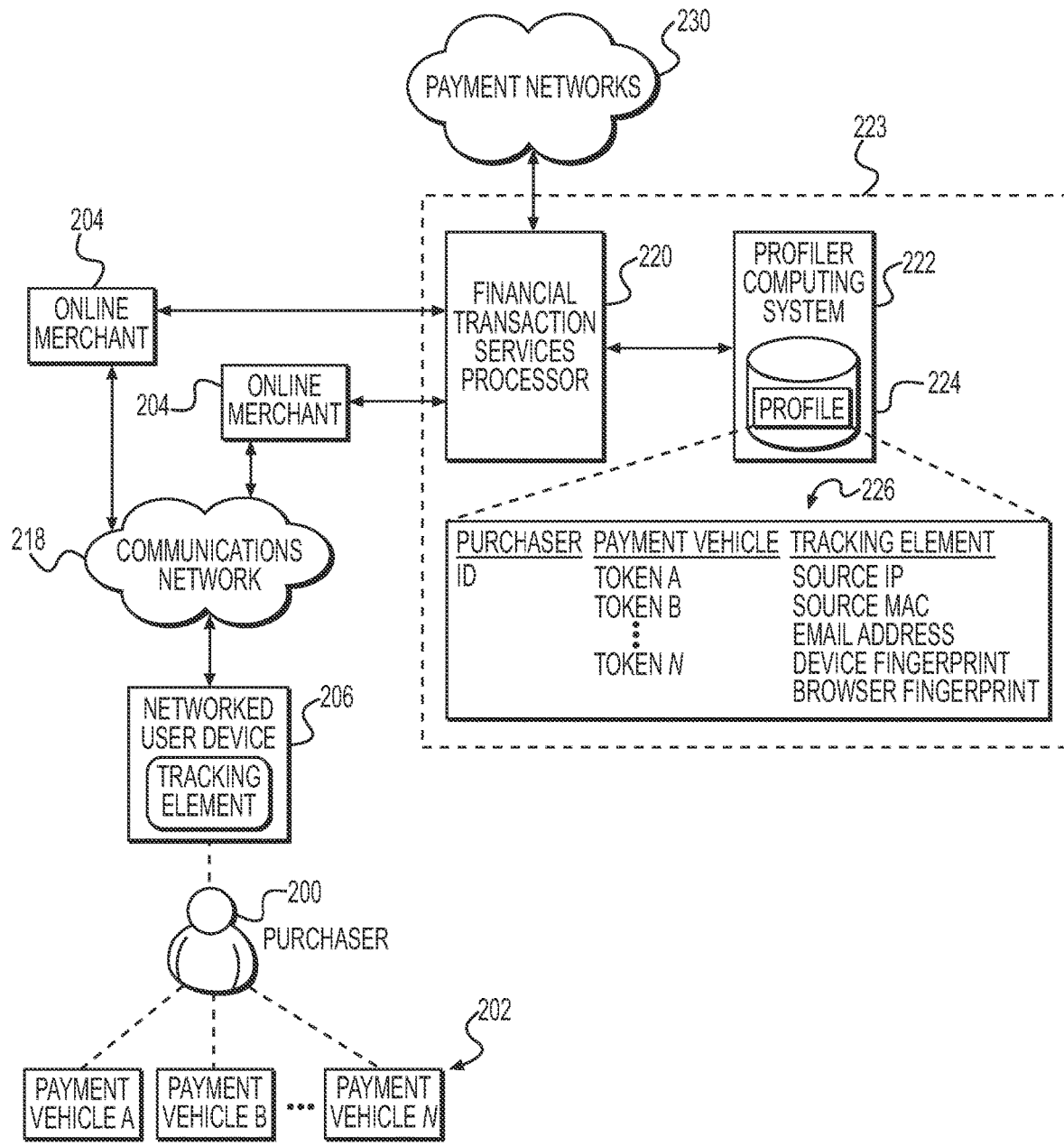
FIGS. 2A-2D depict example system diagrams in accordance with one non-limiting embodiment.
Figure 2B:
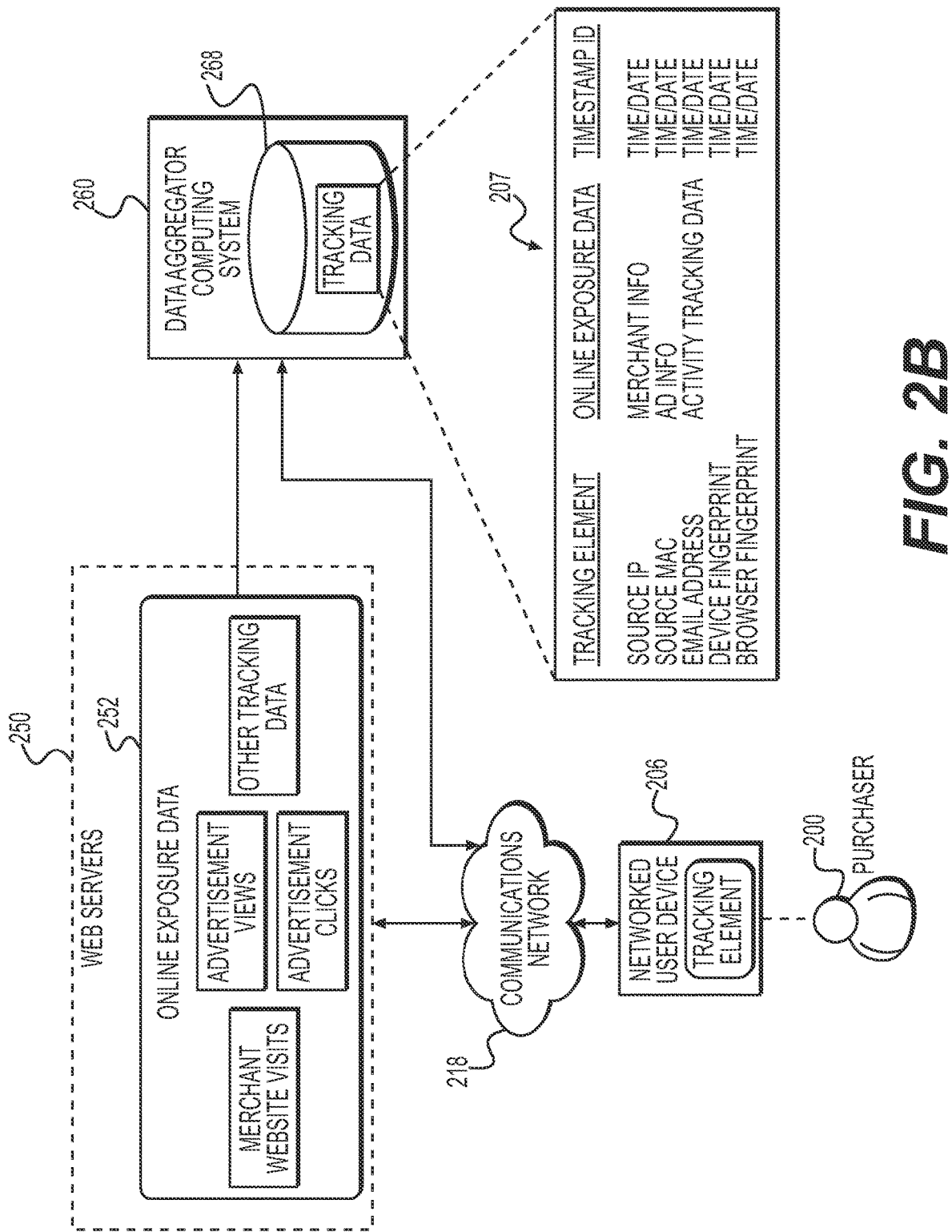
Figure 2C:
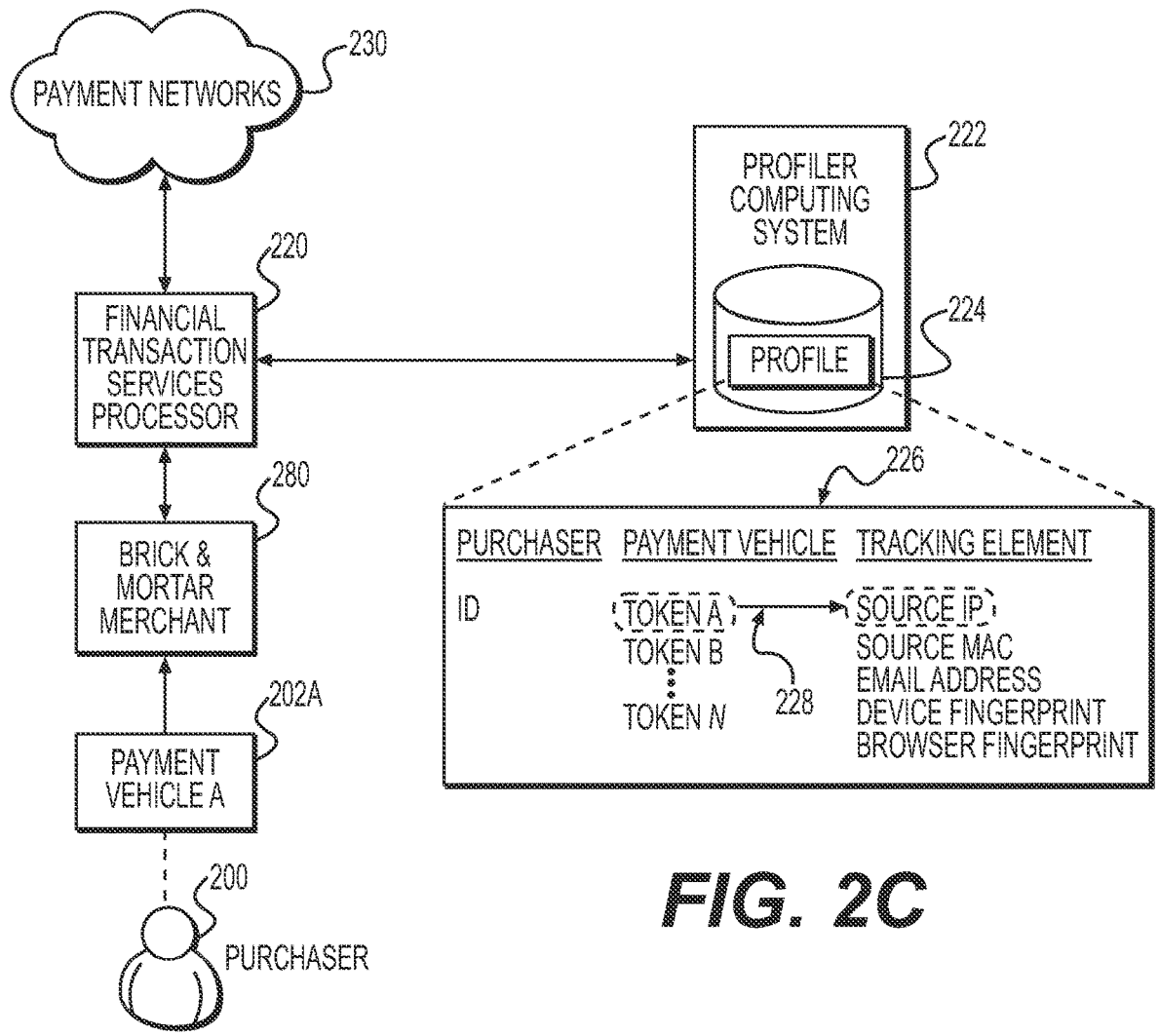
Figure 2D:
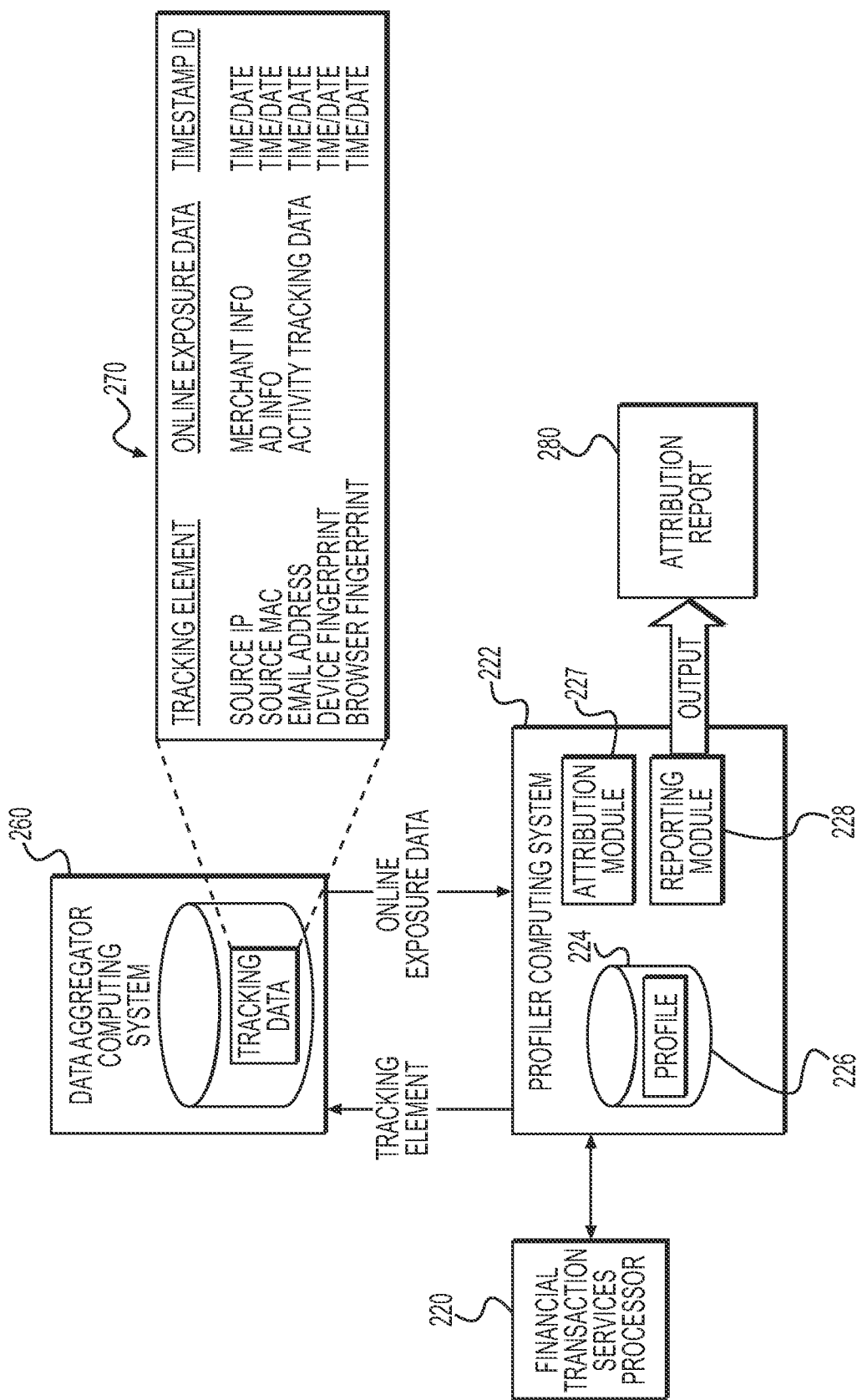

FIGS. 2A-2D depict example system diagrams in according with one non-limiting embodiment, with FIG. 2A schematically depicting profile building, FIG. 2B schematically depicting online tracking, FIG. 2C schematically depicting purchase tracking, and FIG. 2D schematically depicting attribution. Referring first to FIG. 2A, a purchaser 200 is shown that is associated with payment vehicles 202, which are depicted as Payment Vehicles A-N. As is to be appreciated, the payment vehicles 202 can include any type of payment vehicle that can be utilized to initiate a payment transaction. Unless otherwise specified herein, "payment vehicle" includes (1) a physical card including a plastic or paper card with a magnetic stripe, bar code or other indicator indicative of an account number or other account indicative information, and/or (2) a virtual card, such as a display or screenshot for a mobile phone or for another portable device (e.g., a flash drive, smart chip, a laptop or portable computer), or for a computer device (e.g., a desktop computer) in combination with data indicative of an account number or other account indicative information. Data associated with the cards may include an encrypted or unencrypted account number or other encrypted or unencrypted account indicative information and/or encrypted or unencrypted information associated with a particular card, issuer, creator or group of merchants. It is also contemplated that the card may have multiple embodiments or forms. For example, the card may be a physical card (e.g., in the form of magnetic striped plastic card), a virtual card (e.g., in the form of a display on a smart phone), or both. In embodiments in which the card is a virtual card, the corresponding account information (e.g., account number) would initially be provided to the consumer and the consumer would communicate the account information to the merchant. The virtual card may be communicated by displaying a display or screenshot, and/or by transmitting a signal, such as by using NFC (Near Field Communication) technology or other secure transport technologies to complete the transaction with the selected merchant. Optionally, the virtual card may have a display element (e.g., a bar code or string of numbers) which identifies the account number associated with the card. Alternatively, the virtual card may have display elements relating to the merchants that accept the card. Thus, whether the card is physical or virtual, it communicates account information.

Still referring to FIG. 2A, the purchaser 200 utilizes a networked user device 206 to communicate with one or more online merchants 204 through a communications network 218 (e.g., the Internet, a secure network, etc.). The networked user device 206 can be any suitable computing device that facilitates network communications, such as, for example, a laptop computer, a tablet computer, a desktop computer, a smart television, a smart appliance, a mobile computing device, a gaming device, a wearable computing device, and so forth. When interacting with the online merchant 204, the networked user device 206 can be associated with a tracking element. The tracking element can be, for example, an IP address, a MAC address, a device fingerprint, a browser fingerprint, or a unique identifier associated with the networked user device 206. Additionally or alternatively, the tracking element can be an identifier associated with the purchaser 200. For example, in some embodiments, the tracking element can be embodied as, or otherwise include, an email address, a postal address, a phone number, a loyalty account number, a username, and/or any other unique identifier associated with the purchaser 200. Through a web browser executing on the networked user device 206 or through other specialized applications executing on the networked user device 206 (sometimes referred to as apps), the purchaser 200 can initiate purchase events with one or more of the online merchants 204. The online merchant 204 can present a payment interface (e.g., a payment screen, a POS, etc.) to the purchaser 200 in which information for one or more of the payment vehicles 202 is entered. The payment interface can, in turn, communicate with a financial transaction services processor 220 with appropriate authorization messaging. The financial transaction services processor 220 can communicate with various payment networks 230, to seek authorization for the purchase event at the online merchant 204. Information based on the transaction can also be provided to a profiler computing system 222. In some embodiments, the profiler computing system 222 can be a computing system separate from the financial transaction services processor 220 and operated by a separate entity. In other embodiments, the profiler computing system 222 is a component of the financial transaction services processor 220 and operated by the same entity, as indicated by dashed box 223. The information provided to the profiler computing system 222 can be used to build a profile 226 for the purchaser 200. The profile 226 can be stored in a profile data store 224. The profile data store 224 can be maintained by the profiler computing system 222, as is shown, maintained by the financial transaction services processor 220, or maintained by any other suitable device or entity, such as the data aggregator computing system 260 (FIG. 2B). The format and content of the profile 226 can vary, but generally the profile 226 provides a linkage of the payment vehicle(s) 202 used during a purchase event to a tracking element (e.g., device ID or purchaser ID) of the networked user device 206 and/or the purchaser 200. The payment vehicle information as stored in the profile 226 can be tokenized, as may be required by relevant data privacy standards. Over time, as the purchaser 200 makes additional purchases with the same or different payment vehicles 202 using the same or different networked user devices 206, the profile 226 can be updated accordingly. Furthermore, in some embodiments, the profile 226 can utilize house-holding techniques to link a plurality of different purchasers to the same networked user device 206 and/or the same collection of payment vehicles 202.

Referring now to FIG. 2B, the online activity of the purchaser 200 can be monitored and logged as part of the attribution techniques described herein. Using the networked user device 206 (or other computing device), the purchaser 200 can communicate with various web servers 250 over the communications network 218. The purchaser 200 can be performing any of a variety of online activities, such as a keyword searching, visiting a merchant's ecommerce website, activating a link on a banner advertisement, activating a link resulting from a search request, and so forth. Through these interactions, the purchaser 200 is generating online exposure data 252 that can be stored by a data aggregator computing system 260. The data aggregator computing system 260 can be a service provided by a third party, such as Google®, or the data aggregator computing system 260 can be a component of a merchant's ecommerce platform, for example. In any event, the online exposure data 252 can be linked to, or otherwise associated with, the particular tracking element (e.g., the device ID of the networked user device 206 and/or the purchaser ID of the purchaser 200) and entered into a tracking profile 270. The tracking profile 270 can be maintained in a data store 268. In some embodiments, the tracking data maintained by the tracking profile 270 is time stamped. Generally, the data aggregator computing system 260 can monitor and log the purchaser's 200 interactions with various online marketing campaigns, advertisements, and so forth.

Referring now to FIG. 2C, the purchaser 200 is depicted initiating a purchase event at a brick-and-mortar merchant 280 using their payment vehicle 202A. While a brick-and-mortar merchant 280 is shown in FIG. 2C, in other embodiments, the merchant 280 can be an online/ecommerce-based merchant (e.g., a brick-and-mortar retail location of one of the online merchants 204 illustratively shown in FIG. 2A). A POS of the merchant 280 can provide transaction information to the financial transaction services processor 220 using conventional payment transaction communications. The financial transaction services processor 220 can then communicate with payment networks 230, as may be needed, to seek authorization for the purchase event. The financial transaction services processor 220 can also provide information from the purchase event to the profiler computing system 222. In one embodiment, the information is based on the payment vehicle 202A. In other embodiments, alternate or additional information can be provided, such as the name of the purchaser 200, an email address of the purchaser 200, a postal address of the purchaser 200, a phone number of the purchaser 200, a username of the purchaser 200, and/or a loyalty card number of the purchaser 200. In use, the profiler computing system 222 can query the profile data store 224 using the information provided by the financial transaction services processor 220 to determine if a tracking element (e.g., a device ID or a purchaser ID) is affiliated or otherwise associated with the information. In the illustrated embodiment, affiliation 228 between "TokenA" and a "Source IP" address is identified in the profile 226.

Referring now to FIG. 2D, the profiler computing system 222 is shown providing the tracking element (e.g., the device ID or purchaser ID) to the data aggregator computing system 260 as a query. The data aggregator computing system 260 can, in turn, query the tracking profiles 270 in the data store 268 to determine if online exposure data is affiliated with that tracking element. It is to be appreciated that in some embodiments, the tracking profiles 270 can be provided to the profiler computing system 222 in real-time or batch transfers so that the affiliation between a tracking element and any online exposure data can be performed by the profiler computing system 222. In other embodiments, the tracking profiles 270 can be provided to the financial transaction services processor 220 in real-time or batch transfers so that the affiliation between a tracking element and any online exposure data can be performed by the financial transaction services processor 220. In any event, the online exposure data from the tracking profiles 270 can be provided to the profiler computing system 222 for further processing.

Figure 3:
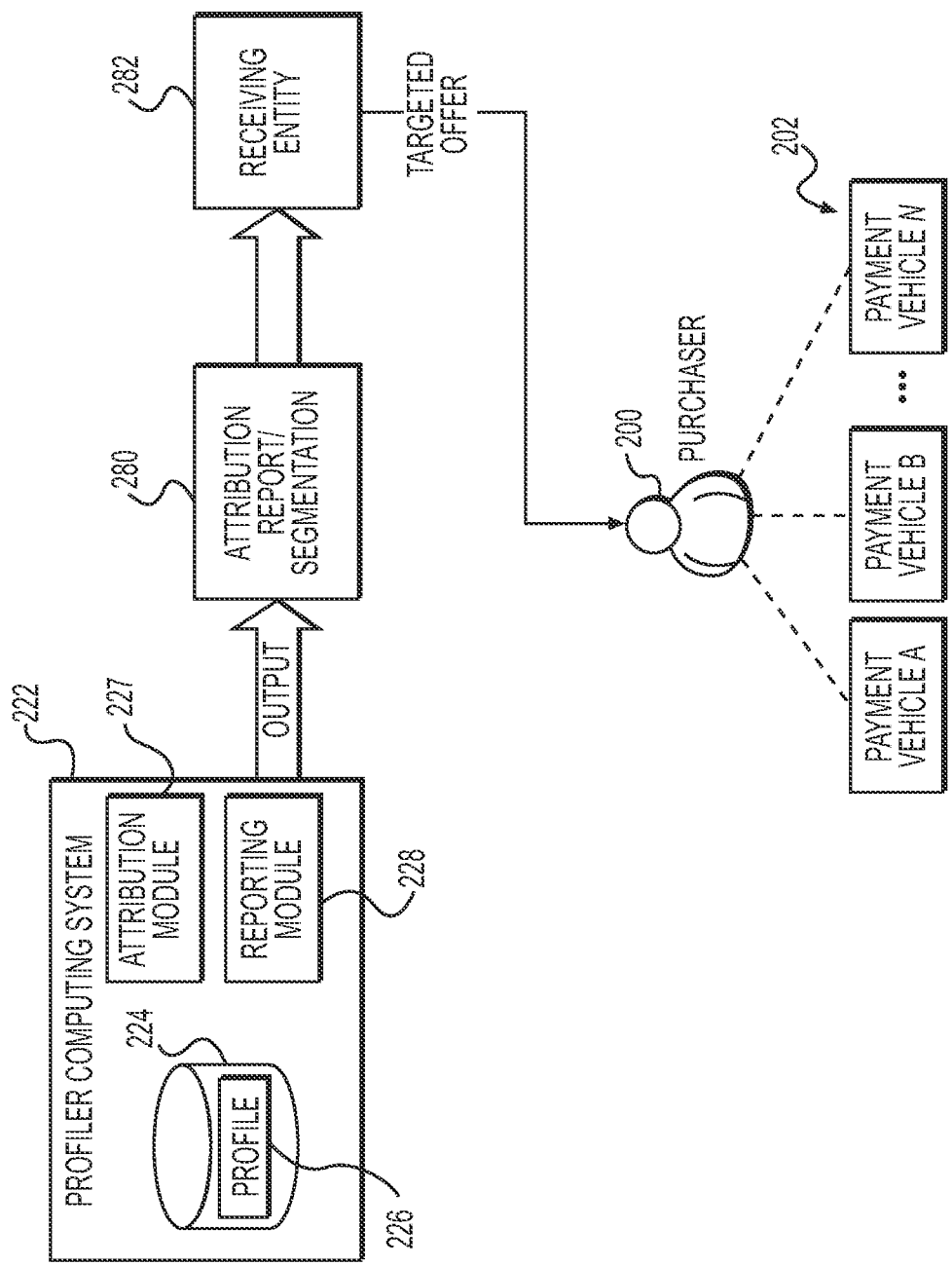
FIG. 3 depicts an example system diagram in which a receiving entity of an attribution report provides targeted offers to purchasers.

As shown in FIG. 3, an attribution module 227 of the profiler computing system 222 can map the online exposure data gathered by the data aggregator computing system 260 to the purchase event at the brick-and-mortar merchant 280 (FIG. 2C). Various rules can be applied by the attribution module 227 to determine whether to map certain online exposure data to the purchase event. Such rules can generally impact whether certain online exposure data will be linked to a subsequent purchase event. Once it is determined if a purchase event, or collection of purchase events, can be attributed to online activity of the purchaser 200, a reporting module 228 can output an attribution report 280 to a receiving entity 282. The receiving entity 282 can be, without limitation, the merchant 280, the data aggregator computing system 260, the financial transaction services processor 220, a marketing/advertisement entity, or any other interested party.

In some embodiments, the attribution report 280 can include market segmentations or other analytics, as may be useful the receiving entity 282. Using the segmentation or other market information provided in the attribution report 280, targeted offers can be provided to the purchaser 200, or grouping of purchasers. For example, the targeted offers can be directed to purchasers who visited particular website, purchasers who have certain types of payment vehicles, purchasers who visit particular merchants, or purchasers satisfying other segmentation parameters.

Figure 4:
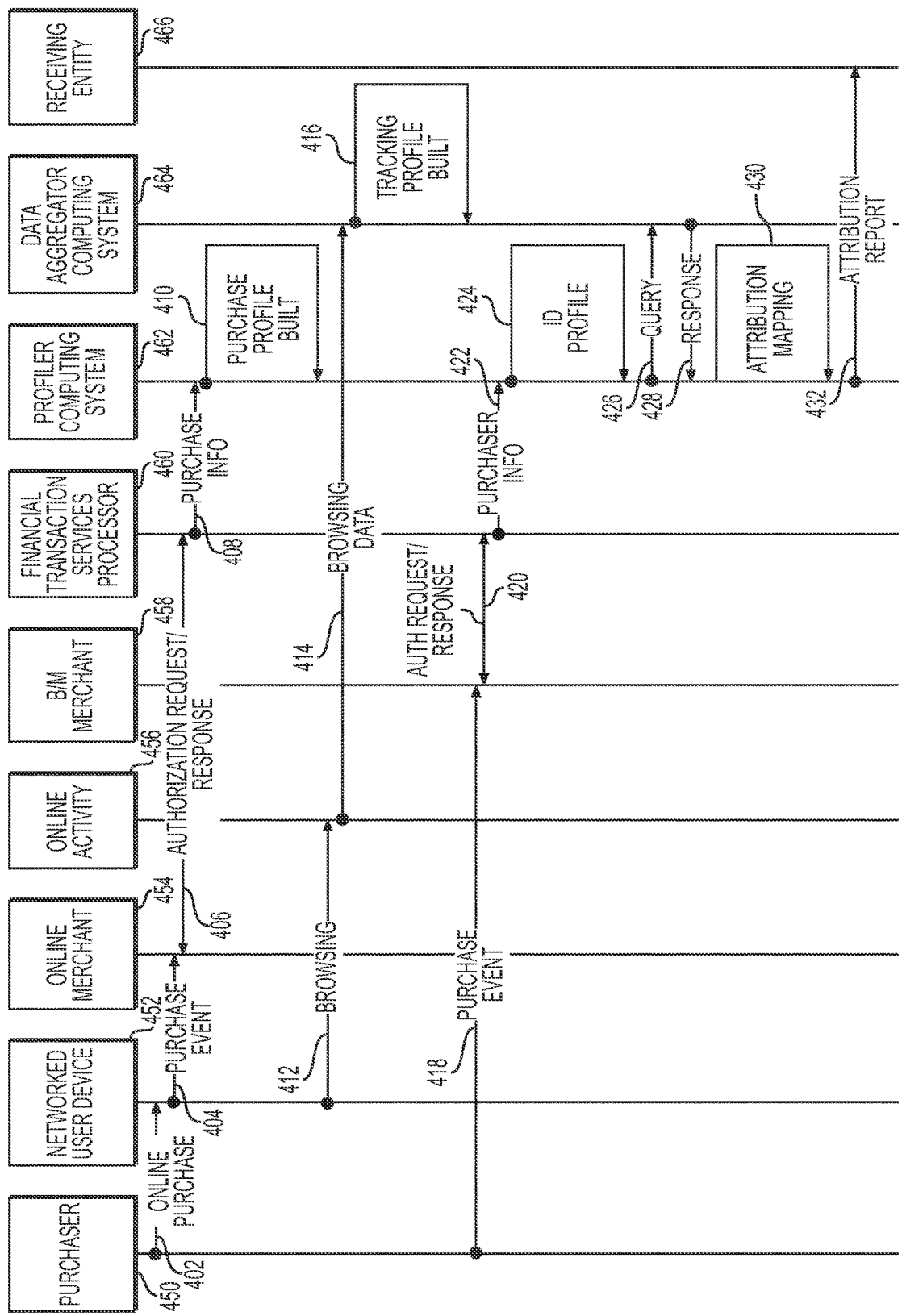
FIG. 4 is an example message sequent chart in accordance with one non-limiting embodiment.

FIG. 4 is an example message sequent chart in accordance with one non-limiting embodiment. As is to be appreciated, various entities or processes illustrated in FIG. 4 can be combined into single entities without departing from the scope of the present disclosure. Furthermore, the particular ordering of the messaging depicted in FIG. 4 is for illustration purposes only. An online purchase 402 is first initiated by a purchaser 450 on a networked user device 452. A purchase event 404 is then initiated at an online merchant 454. The online merchant 454 can then communicate with a financial transaction services processor 460 to transmit an authorization request 406 and receive a response 406. The financial transaction services processor 460 can also provide purchase information 408 to a profiler computing system 462. The purchase information 408 can include, for example, a tracking element (e.g., a device ID of the networked user device 452 or a purchaser ID of the purchaser 450) to the profiler computing system 462. Additionally, the purchase information 408 can include payment vehicle information. The profiler computing system 462 can then build a purchaser profile 410.

Internet-based browsing 412 can then occur through the networked user device 452 engaging in online activity 456. Browsing data 414 can be gathered by a data aggregator computing system 464. The data aggregator computing system 464 can build a tracking profile 416 based on the online activity 456 and a tracking element associated the networked user device 452 (e.g., a device ID) and/or a tracking element associated with the purchaser 450 (e.g., a purchaser ID).

A subsequent purchase event 418 can then be initiated by the purchaser 450 at a brick-and-mortar merchant 458. During that purchase event, authorization communications 420 can occur between a POS of the merchant 458 and the financial transaction services processor 460. The financial transaction services processor 460 can provide purchase information 422 to the profiler computing system 462. The purchase information 422 can comprise, for example, payment vehicle information. The profiler computing system 462 can use the purchase information 422 to query the purchaser profiles to identify a purchaser profile 424 of the purchaser 450 and determine a particular tracking element (e.g., a device ID, a purchaser ID, etc.) linked or otherwise associated therewith. The tracking element can then be sent within a query 426 to the data aggregator computing system 464. The data aggregator computing system 464 can respond 428 with a report, which can include online exposure data linked to that tracking element. In some embodiments, the data aggregator computing system 464 can respond with a message indicting that no online exposure data is linked to the tracking element. The profiler computing system 462 can then attribute the subsequent purchase event 418 at the brick-and-mortar merchant 458 to the online activity 456 through attribution mapping 430. An attribution report 430 can then be provided to a receiving entity 466.

Figure 5:
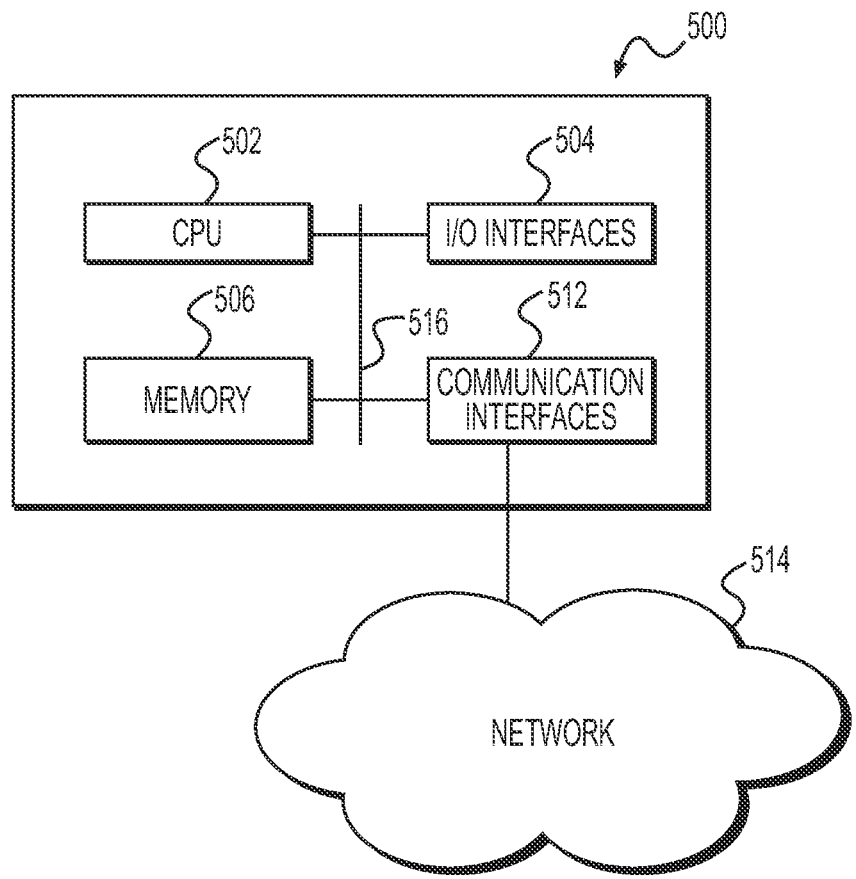
FIG. 5 depicts an example computing device.

The processes described above can be performed on or between one or more computing devices 500. Referring now to FIG. 5, an example computing device 500 is presented. A computing device 500 can be a server, a computing device that is integrated with other systems or subsystems, a mobile computing device, a cloud-based computing capability, and so forth. The computing device 500 can be any suitable computing device as would be understood in the art, including without limitation, a custom chip, an embedded processing device, a tablet computing device, a financial transaction services processor, a profiler computing system, a data aggregator computing system, a personal data assistant (PDA), a desktop, a laptop, a microcomputer, a minicomputer, a server, a mainframe, or any other suitable programmable device. In various embodiments disclosed herein, a single component can be replaced by multiple components and multiple components can be replaced by a single component to perform a given function or functions. Except where such substitution would not be operative, such substitution is within the intended scope of the embodiments.

The computing device 500 includes a processor 502 that can be any suitable type of processing unit, for example a general purpose central processing unit (CPU), a reduced instruction set computer (RISC), a processor that has a pipeline or multiple processing capability including having multiple cores, a complex instruction set computer (CISC), a digital signal processor (DSP), an application specific integrated circuits (ASIC), a programmable logic devices (PLD), and a field programmable gate array (FPGA), among others. The computing resources can also include distributed computing devices, cloud computing resources, and virtual computing resources in general.

The computing device 500 also includes one or more memories 506, for example read only memory (ROM), random access memory (RAM), cache memory associated with the processor 502, or other memories such as dynamic RAM (DRAM), static RAM (SRAM), programmable ROM (PROM), electrically erasable PROM (EEPROM), flash memory, a removable memory card or disk, a solid state drive, and so forth. The computing device 500 also includes storage media such as a storage device that can be configured to have multiple modules, such as magnetic disk drives, floppy drives, tape drives, hard drives, optical drives and media, magneto-optical drives and media, compact disc drives, Compact Disc Read Only Memory (CDROM), Compact Disc Recordable (CD-R), Compact Disc Rewriteable (CD-RW), a suitable type of Digital Versatile Disc (DVD) or BluRay disc, and so forth. Storage media such as flash drives, solid state hard drives, redundant array of individual disks (RAID), virtual drives, networked drives and other memory means including storage media on the processor 502, or memories 506 are also contemplated as storage devices. It can be appreciated that such memory can be internal or external with respect to operation of the disclosed embodiments. It can be appreciated that certain portions of the processes described herein can be performed using instructions stored on a computer-readable medium or media that direct a computer system to perform the process steps. Non-transitory computer-readable media, as used herein, comprises all computer-readable media except for transitory, propagating signals.

Network and communication interfaces 512 can be configured to transmit to, or receive data from, other computing devices 500 across a network 514. The network and communication interfaces 512 can be an Ethernet interface, a radio interface, a Universal Serial Bus (USB) interface, or any other suitable communications interface and can include receivers, transmitter, and transceivers. For purposes of clarity, a transceiver can be referred to as a receiver or a transmitter when referring to only the input or only the output functionality of the transceiver. Example communication interfaces 512 can include wired data transmission links such as Ethernet and TCP/IP. The communication interfaces 512 can include wireless protocols for interfacing with private or public networks 514. For example, the network and communication interfaces 512 and protocols can include interfaces for communicating with private wireless networks such as a Wi-Fi network, one of the IEEE 802.11x family of networks, or another suitable wireless network. The network and communication interfaces 512 can include interfaces and protocols for communicating with public wireless networks 512, using for example wireless protocols used by cellular network providers, including Code Division Multiple Access (CDMA) and Global System for Mobile Communications (GSM). The computing device 500 can use network and communication interfaces 512 to communicate with hardware modules such as a database or data store, or one or more servers or other networked computing resources. Data can be encrypted or protected from unauthorized access.

In various configurations, the computing device 500 can include a system bus 516 for interconnecting the various components of the computing device 500, or the computing device 500 can be integrated into one or more chips such as programmable logic device or application specific integrated circuit (ASIC). The system bus 516 can include a memory controller, a local bus, or a peripheral bus for supporting input and output devices 504, and communication interfaces 512. Example input and output devices 504 include keyboards, keypads, gesture or graphical input devices, motion input devices, touchscreen interfaces, one or more displays, audio units, voice recognition units, vibratory devices, computer mice, and any other suitable user interface or device for receiving user inputs and/or outputting information.

The processor 502 and memory 506 can include nonvolatile memory for storing computer-readable instructions, data, data structures, program modules, code, microcode, and other software components for storing the computer-readable instructions in non-transitory computer-readable mediums in connection with the other hardware components for carrying out the methodologies described herein. Software components can include source code, compiled code, interpreted code, executable code, static code, dynamic code, encrypted code, or any other suitable type of code or computer instructions implemented using any suitable high-level, low level, object-oriented, visual, compiled, or interpreted programming language.

Figure 6:
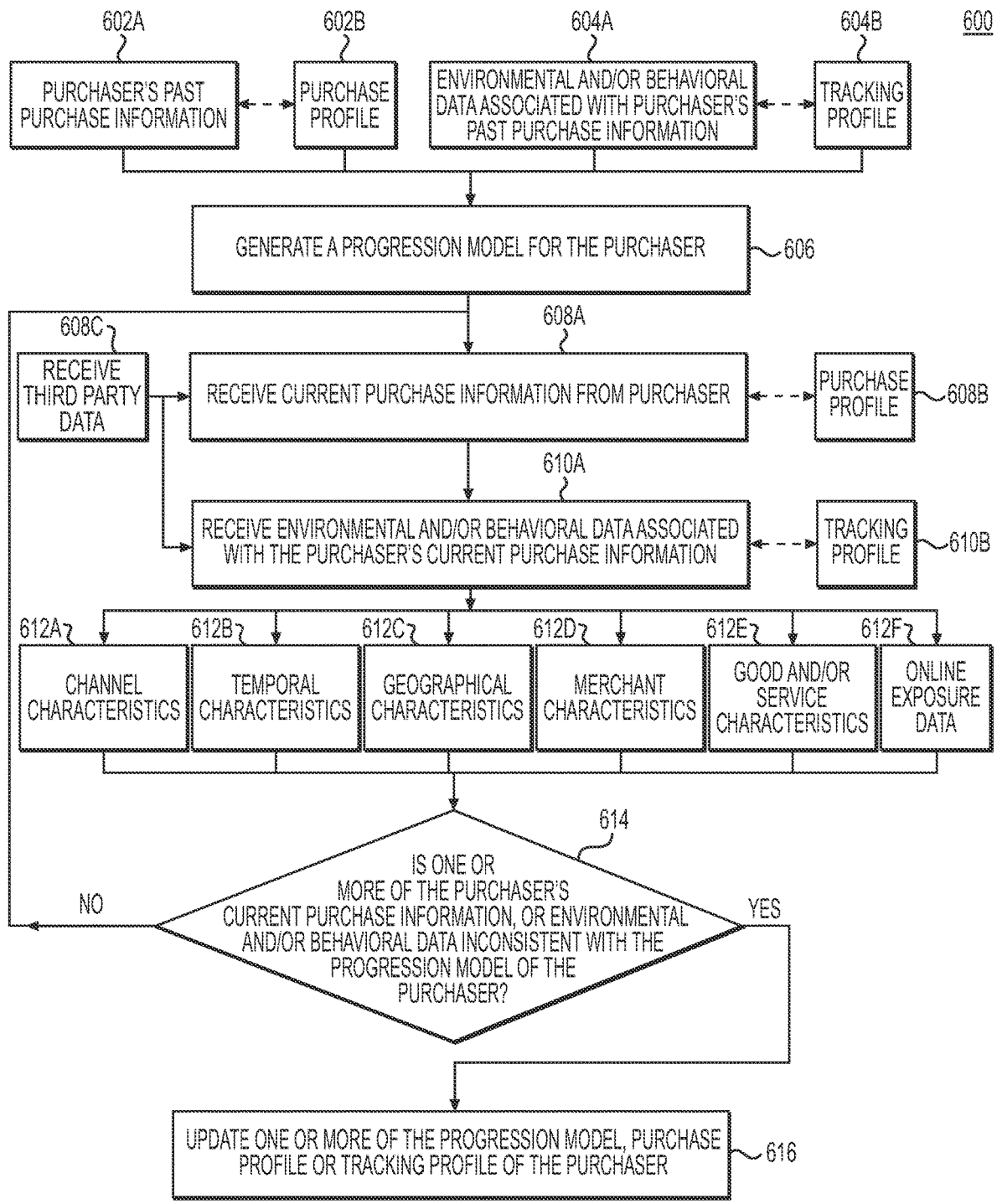
FIG. 6 is a flow chart depicting an example process for generating and/or updating a progression model of a purchaser based on historical transaction activity progressions.

FIG. 6 is a flow chart depicting an example process 600 for generating and/or updating a progression model of a purchaser based on historical transaction activity progressions. Process 600 may be performed by one or more of financial transaction services processor 220, profiler computing system 222, and/or data aggregator computing system 260.

Step 602A may include receiving a purchaser's past purchase information. In some embodiments, the purchaser's past purchase information may be found from and/or be used to create or update the purchase profile 224 and/or the profiler computing system 222 associated with the purchaser. Information from the purchase profile 224 and/or the profiler computing system 222 of the purchaser may also be received (e.g., as in step 602B). The past purchase information includes past transactional information, e.g., past transaction amounts, merchant identifiers (MID) of past transactions, and/or data related to or identifying the payment methods and/or payment vehicles used in the past transactions, among other information. In some embodiments, the past purchase information may include, a tracking element (e.g., a device ID of the networked user device 452 or computing system of the purchaser, or a purchaser ID of the purchaser 450) to the profiler computing system 462.

Step 604A may include receiving environmental and/or behavioral data associated with the purchaser's past purchase information (received in step 602A). In some embodiments, the environmental and/or behavioral data associated with the purchaser's past purchase information may be found from and/or be used to create or update the tracking data 268 and/or data aggregator computing system 260 associated with the purchaser ("tracking profile"). Information from the tracking profile may also be received (e.g., as in step 604B). For example, the received information may include the tracking element that links the networked user devices and/or computing systems used by the purchaser with the various payment networks used by the purchaser or the online exposure data associated with the networked user devices and/or computing systems of the purchaser. In various embodiments, environmental and/or behavioral data associated with a purchase information (current or past) may refer to, for example, characteristics related to the channel of a purchase (e.g., "channel characteristics"), characteristics related to the timing of the purchase transaction(s) (e.g., "temporal characteristics"), characteristics related to the geographical location of the purchase transaction(s) (e.g., "geographical characteristics"), characteristics of the merchant(s) involved in the payment transaction(s) (e.g., "merchant characteristics"), characteristics related to the good(s) and/or service(s) purchased (e.g., "good and/or service characteristics"), and/or online exposure data (e.g., received via the tracking profile).

Step 606 may include generating a progression model for the purchaser. In some embodiments, the progression model may include a representation of the shifts and/or changes in environmental and/or behavioral data over a duration of time ("historical purchase activity progressions"). The progression model may be based on the received information on the purchaser's past purchase events and the environmental and/or behavioral data associated with the past purchase events. The shifts or changes in the environmental and/or behavioral data may pertain to, for example, a purchaser's dealings with a merchant and/or merchant category over time, a purchaser's transactions over particular good(s) and/or services over time, and/or a purchaser's use of a particular payment method and/or payment network, relative to other payment method and/or payment network ("wallet share").

For example, in a progression model exploring the progression of a purchaser's interactions with a merchant group (e.g., coffee sellers) over the duration of a year, the progression model may show that the geographical characteristics of the interaction changed from the purchaser purchasing coffee at the location of a first brick-and-mortar coffee shop to the location of a second brick-and-mortar coffee shop. Likewise, the same progression model may show that the channel characteristics changed from the purchaser conducting the entire transaction at the first brick-and-mortar coffee shop, then to conducting a part of the transaction over a mobile application, then to conducting the complete transaction over a mobile application and merely picking up the coffee at the second brick-and-mortar coffee shop.

Step 608 may include receiving current purchase information from the purchaser. The current purchase information may include, e.g., purchase information associated with the most recent transaction or a transaction that occurred within an immediate time period. In one embodiment, the current purchase information may be that associated with more than one transaction in the immediate or recent period. In some embodiments, the current purchase information may be retrieved and/or be used to create or update the purchase profile 224 and/or the profiler computing system 224 associated with the purchaser (e.g., as in step 608B).

Alternately or additionally, step 608A may include receiving third party data, which may include, for example, purchase information for one or more purchase events, and may be received from a merchant, merchant department, a Stock Keeping Unit (SKU), etc. The third party data may allow for greater accuracy in determining trends in a purchaser's spend behavior. Such an embodiment may involve partnership with third parties either to provide license to this data or the data itself to further enhance models.

Step 610A may include receiving environmental and/or behavioral data associated with the purchaser's current purchase information (received in step 608A). In some embodiments, the current purchase information may be retrieved from and/or be used to create or update the tracking profile (e.g., as in step 610B). As explained above, the environmental and/or behavioral data associated with the purchaser's current purchase information may include, but is not limited to one or more of the channel characteristics 612A, temporal characteristics 612B, geographical characteristics 612C, merchant characteristics 612D, good and/or service characteristics 612E of the current purchase, and/or online exposure data 612F.

The environmental and/or behavioral data associated with current purchase events may be used to analyze trends in the purchaser's spend behaviors, e.g., by comparing the environmental and/or behavioral data of the current purchase events with the environmental and/or behavioral data of past purchase events in the progression model. In some embodiments, there may also be a comparison of certain purchase information (e.g., payment methods and/or payment networks) between the current and past purchase events to analyze trends in a purchaser's spend behaviors.

In some embodiments, environmental and/or behavioral data may be received from third party data (e.g., as in 608B). For example, third party data provided by merchants and/or stock keeping units may allow for progression models to account not only for the category and amount of purchase, but the basket level detail as well (e.g., good and/or service characteristics). Such an embodiment requires partnership with third parties either to provide license to this data or the data itself to further enhance models.

Identifying the channel characteristics 612A (e.g., online purchase, purchase at a brick and mortar location, in-app purchase, mobile purchase, etc.) of purchase events of the purchaser can provide a deeper insight into how the purchaser shops. The progression model may be useful for retailers and other merchants who may be interested in how their customers (current or potential), like the purchaser, shop. Such insight may provide an opportunity for merchants to identify when purchasers are shifting their buying patterns across channels, e.g. switching purchases in a certain category from retail to online or in-app, which may provide a further opportunity for merchants to influence the spend behavior of the purchaser, e.g., by aligning messaging for promotions, etc.

Likewise, the temporal characteristics 612B of the current purchase events of the purchaser may be compared with the temporal characteristics of past purchase events of the purchaser in the progression model to provide further insights. Temporal characteristics may include, for example, the duration of a purchase event, the time in which the purchase event was initiated (e.g., the purchaser begins browsing items at a store), and/or the time in which the transaction occurred, among other things. In some embodiments, online or mobile transactions may or may not have a durational component, as they are not constrained by typical retail hours. In such embodiments, other temporal characteristics may be taken into account, (including time at which the transaction occurs) and then may be compared with the past temporal characteristics of the progression model to provide insights. Furthermore, online or mobile orders at a restaurant or coffee shop which are sequenced between retail and entertainment transactions may indicate that the online transaction is occurring within the context of a shopping trip. However, mobile or online indicators may indicate a consumer propensity to choose online/mobile transactions within the shopping context. Conversely, late night, early morning, or lunchtime online orders for hard goods or apparel to be delivered to a home or workplace may indicate different (but not necessarily mutually exclusive) consumer propensities. Each may have an influence on how and when outbound communications may be delivered for retention, extension, or acquisition and how that marketing content is constructed. Because online or mobile transactions are more likely to occur as standalone transactions (vs. in a shopping sequence) and or via an asynchronous timeline, progression modeling may account for variations in typical retail progressions differently. For example, in cases where a "next transaction in the pattern" is missed, the presence of an online transaction within a defined timeframe in the same category may indicate that a consumer is switching or expanding the channel(s) of purchase (e.g., from purchasing at a brick and mortar location to purchasing online or to purchasing both at a brick-and-mortar location and online) for satisfying the need.

Furthermore, certain purchase information (e.g., payment methods and/or payment networks used in purchase events) may be compared between the current and past purchase events to analyze trends in a purchaser's spend behaviors, e.g., changes in wallet share. Consideration of online or mobile transactions in progression modeling may facilitate broader and more accurate share of wallet analysis, which may be useful for merchants and financial institutions.

The various environmental and/or behavioral data may be accessed by or be supplemented with the online exposure data 612F of the purchaser. For example, geographical characteristics of the purchaser may be known using geolocation tracking data of the networked user device of the purchaser. Online exposure data 612F of the purchaser can be uniquely identified by using identifying and tracking the activity within a networked user device and/or computing system of the purchaser ("device fingerprinting"). The networked user device and/or computer system of the purchaser may be identified and/or tracked using, for example, an IP address, an OS configuration, a static HTIP, browser and plug-in variables (balancing diversity and stability).

Step 614 may include determining whether one or more of the purchaser's current purchase information, or environmental and/or behavioral data is inconsistent with the progression model of the purchaser. In some embodiments, step 614 may include, for example, comparing the environmental and/or behavioral data associated with the current payment transaction with the progression model, or comparing the environmental and/or behavioral data associated with the current payment transaction the environmental and/or behavioral data of the past payment transaction. For example, like the shifts and changes in environmental and/or behavioral data over a duration of time captured by the progression model in step 606 ("historical purchase activity progressions"), step 614 may include determining a shift or change between the environmental and/or behavioral data associated with the current payment transaction with environmental and/or behavioral data associated with one or more past payment transactions. In such embodiments, step 614 may further include determining, based on the comparison, whether the shift or change of one or more of the past payment transactions to the current payment transaction maps to one f the historical purchase progressions of the progression model. If, subsequent to step 614, one or more of the purchaser's current purchase information, or environmental and/or behavioral data is inconsistent with the progression model of the purchaser, step 616 may include updating one or more of the progression model, purchase profile 226, or tracking profile of the purchaser. For example, if in the recent purchase events, the purchaser is changing the channel of purchase for buying coffee from purchasing using mobile apps to purchasing at the brick-and-mortar location, whereas the progression model previously shows a trend of the purchaser moving from purchasing at the brick-and-mortar location to purchasing using mobile apps, the progression model may be updated to show a reversal of the trend.

If, subsequent to step 614, one or more of the purchaser's current purchase information, or environmental and/or behavioral data is consistent with the progression model of the purchaser, at least the progression model of the purchaser may be maintained and/or step 208 may be repeated (e.g., the system may continue to receive current purchase information from the purchaser).

In some embodiments, the profiler computing system 222, data aggregator computing system 260, data aggregator computing system 260, financial transaction services processor 220 (or computing devices thereof), payment networks 230 (or computing devices thereof), networked user device 206, online merchant 204 (or computing devices thereof), brick and mortar merchant 280 (or computing devices thereof), receiving entity 282 (or computing devices thereof), and web servers 250 can each establish an environment during operation. Each environment can include various modules, components, sub-components, and devices commonly found in computing devices, which are not illustrated in the figures for clarity of the description. The various modules, components, sub-components, and devices of each environment can be embodied as hardware, firmware, software, or a combination thereof. For example, one or more of the modules, components, sub-components, and devices of each environment can be embodied as a processor and/or a controller configured to provide the functionality described herein.

These and other embodiments of the systems and methods can be used as would be recognized by those skilled in the art. The above descriptions of various systems and methods are intended to illustrate specific examples and describe certain ways of making and using the systems disclosed and described here. These descriptions are neither intended to be nor should be taken as an exhaustive list of the possible ways in which these systems can be made and used. A number of modifications, including substitutions of systems between or among examples and variations among combinations can be made. Those modifications and variations should be apparent to those of ordinary skill in this area after having read this disclosure.

The invention claimed is:

1. A computer-implemented method of predicting consumer spending behavior based on historical purchase activity progressions, comprising:
receiving, by a profiler computing system, transaction data related to one or more past payment transactions;
receiving, by the profiler computing system, environmental and/or behavioral data associated with each of the one or more past payment transactions;
determining, by the profiler computing system, a plurality of historical purchase activity progressions;
receiving, by the profiler computing system, transaction data related to a current payment transaction associated with a payment vehicle;
generating, by the profiler computing system, a payment vehicle token by tokenizing payment vehicle data, based on the transaction data related to the current payment transaction;
affiliating, by the profiler computing system, the current payment transaction to the payment vehicle token;
receiving, by the profiler computing system, environmental and/or behavioral data associated with the current payment transaction associated with the payment vehicle token;
comparing, by the profiler computing system, the environmental and/or behavioral data associated with the one or more of the past payment transactions with the environmental and/or behavioral data associated with the current payment transaction associated with the payment vehicle token;
determining, by the profiler computing system, using the comparison, whether a shift or a change in geographical characteristics of geographical locations or channel characteristics related to channels of one or more past payment transactions to the current payment transaction associated with the payment vehicle token maps to at least one of the plurality of historical purchase activity progressions; and generating, by the profiler computing system, an indication of at least one predicted purchase transaction based on the at least one of the plurality of historical purchase activity progression.

2. The method of claim 1, wherein the environmental and/or behavioral data associated with the one or more of the past payment transactions or the current payment transaction includes, one or more of:
data related to a channel of purchase used in the one or more of the past payment transactions or the current payment transaction;
temporal data related to the one or more of the past payment transactions or the current payment transaction;
data related to a geographical location of a consumer or a merchant in the one or more of the past payment transactions or the current payment transaction;
data related to the merchant in the one or more of the past payment transactions or the current payment transaction;
data related to a good or service being transacted for in the one or more of the past payment transactions or the current payment transaction;
data related to any online activity of the consumer; and
the transaction data related to the one or more of the past payment transactions or the current payment transaction.

3. The method of claim 1, wherein the determining of whether the shift or the change of one or more past payment transactions to the current payment transaction associated with the payment vehicle token maps to the at least one of the plurality of historical purchase activity progressions comprises:
determining whether the environmental and/or behavioral data associated with the one or more past payment transactions and the environmental and/or behavioral data associated with the current payment transaction reflects one or more trends in environmental and/or behavioral data for the plurality of historical purchase activity progressions.

4. The method of claim 1, wherein the generating the indication of the at least one predicted purchase transaction comprises:
generating an indication of one or more environmental and/or behavioral data associated with the at least one predicted purchase transaction.

5. The method of claim 1, further comprising:
generating a targeted offer for a consumer based on the indication of the predicted purchase transaction.

6. The method of claim 5, further comprising:
transmitting the targeted offer to the consumer based on the indication of the predicted purchase transaction, the targeted offer being an electronic offer to the consumer.

7. The method of claim 1, further comprising:
transmitting the indication of the at least one predicted purchase transaction, the indication of the at least one predicted purchase transaction being an indication of a change in a usage of one or more payment vehicles or payment networks used in payment transactions.

8. A system of predicting consumer spending behavior based on historical purchase activity progressions, the system comprising:
one or more computer readable media storing instructions for predicting the consumer spending behavior; and
one or more processors configured to execute the instructions to perform operations comprising:

receiving, by a profiler computing system, transaction data related to one or more past payment transactions;

receiving, by the profiler computing system, environmental and/or behavioral data associated with each of the one or more past payment transactions;

determining, by the profiler computing system, a plurality of historical purchase activity progressions;

receiving, by the profiler computing system, transaction data related to a current payment transaction associated with a payment vehicle;

generating, by the profiler computing system, a payment vehicle token by tokenizing payment vehicle data, based on the transaction data related to the current payment transaction;

affiliating, by the profiler computing system, the current payment transaction to the payment vehicle token;

receiving, by the profiler computing system, environmental and/or behavioral data associated with the current payment transaction associated with the payment vehicle token;

comparing, by the profiler computing system, the environmental and/or behavioral data associated with the one or more of the past payment transactions with the environmental and/or behavioral data associated with the current payment transaction associated with the payment vehicle token;

determining, by the profiler computing system, using the comparison, whether a shift or a change in geographical characteristics of geographical locations or channel characteristics related to channels of one or more past payment transactions to the current payment transaction associated with the payment vehicle token maps to at least one of the plurality of historical purchase activity progressions; and generating, by the profiler computing system, an indication of at least one predicted purchase transaction based on the at least one of the plurality of historical purchase activity progression.

9. The system of claim 8, wherein the environmental and/or behavioral data associated with the one or more of the past payment transactions or the current payment transaction includes, one or more of:

data related to a channel of purchase used in the one or more of the past payment transactions or the current payment transaction;

temporal data related to the one or more of the past payment transactions or the current payment transaction;

data related to a geographical location of a consumer or a merchant in the one or more of the past payment transactions or the current payment transaction;

data related to the merchant in the one or more of the past payment transactions or the current payment transaction;

data related to a good or service being transacted for in the one or more of the past payment transactions or the current payment transaction;

data related to any online activity of the consumer; and the transaction data related to the one or more of the past payment transactions or the current payment transaction.

10. The system of claim 8, wherein the determining of whether the shift or the change of one or more past payment transactions to the current payment transaction associated with the payment vehicle token maps to the at least one of the plurality of historical purchase activity progressions comprises:

determining whether the environmental and/or behavioral data associated with the one or more past payment transactions and the environmental and/or behavioral data associated with the current payment transaction reflects one or more trends in environmental and/or behavioral data for the plurality of historical purchase activity progressions.

11. The system of claim 8, wherein the generating the indication of the at least one predicted purchase transaction comprises:

generating an indication of one or more environmental and/or behavioral data associated with the at least one predicted purchase transaction.

12. The system of claim 8, the operations further comprising:

generating a targeted offer for a consumer based on the indication of the predicted purchase transaction.

13. The system of claim 12, the operations further comprising:

transmitting the targeted offer to the consumer based on the indication of the predicted purchase transaction, the targeted offer being an electronic offer to the consumer.

14. The system of claim 8, the operations further comprising:

transmitting the indication of the at least one predicted purchase transaction, the indication of the at least one predicted purchase transaction being an indication of a change in a usage of one or more payment vehicles or payment networks used in payment transactions.

15. A non-transitory machine-readable medium stores instructions that, when executed by a profiler computing system, causes the profiler computing system to perform operations for predicting consumer spending behavior based on historical purchase activity progressions, the operations comprising:

receiving, by the profiler computing system, transaction data related to one or more past payment transactions;

receiving, by the profiler computing system, environmental and/or behavioral data associated with each of the one or more past payment transactions;

determining, by the profiler computing system, a plurality of historical purchase activity progressions;

receiving, by the profiler computing system, transaction data related to a current payment transaction associated with a payment vehicle;

generating, by the profiler computing system, a payment vehicle token by tokenizing payment vehicle data, based on the transaction data related to the current payment transaction;

affiliating, by the profiler computing system, the current payment transaction to the payment vehicle token;

receiving, by the profiler computing system, environmental and/or behavioral data associated with the current payment transaction associated with the payment vehicle token;

comparing, by the profiler computing system, the environmental and/or behavioral data associated with the one or more of the past payment transactions with the environmental and/or behavioral data associated with the current payment transaction associated with the payment vehicle token;

determining, by the profiler computing system, using the comparison, whether a shift or a change in geographical characteristics of geographical locations or channel characteristics related to channels of one or more past payment transactions to the current payment transaction associated with the payment vehicle token maps to at least one of the plurality of historical purchase activity progressions; and generating, by the profiler computing system, an indication of at least one predicted purchase transaction based on the at least one of the plurality of historical purchase activity progression.

16. The non-transitory machine-readable medium of claim 15, wherein the environmental and/or behavioral data associated with the one or more of the past payment transactions or the current payment transaction includes, one or more of:

data related to a channel of purchase used in the one or more of the past payment transactions or the current payment transaction;

temporal data related to the one or more of the past payment transactions or the current payment transaction;

data related to a geographical location of a consumer or a merchant in the one or more of the past payment transactions or the current payment transaction;

data related to the merchant in the one or more of the past payment transactions or the current payment transaction;

data related to a good or service being transacted for in the one or more of the past payment transactions or the current payment transaction;

data related to any online activity of the consumer; and the transaction data related to the one or more of the past payment transactions or the current payment transaction.

17. The non-transitory machine-readable medium of claim 15, wherein the determining of whether the shift or the change associated with the current payment transaction associated with the payment vehicle token maps to the at least one of the plurality of historical purchase activity progressions comprises:

determining whether the environmental and/or behavioral data associated with the one or more past payment transactions and the environmental and/or behavioral data associated with the current payment transaction reflects one or more trends in environmental and/or behavioral data for the plurality of historical purchase activity progressions.

18. The non-transitory machine-readable medium of claim 15, wherein the generating the indication of the at least one predicted purchase transaction comprises:

generating an indication of one or more environmental and/or behavioral data associated with the at least one predicted purchase transaction.

19. The non-transitory machine-readable medium of claim 15, the operations further comprising:

generating a targeted offer for a consumer based on the indication of the predicted purchase transaction; and transmitting the targeted offer to the consumer based on the indication of the predicted purchase transaction, the targeted offer being an electronic offer to the consumer.

20. The non-transitory machine-readable medium of claim 15, the operations further comprising:

transmitting the indication of the at least one predicted purchase transaction, the indication of the at least one predicted purchase transaction being an indication of a change in a usage of one or more payment vehicles or payment networks used in payment transactions.

* * * * *